United States Patent
Sailer et al.

(10) Patent No.: US 12,201,132 B2
(45) Date of Patent: Jan. 21, 2025

(54) SAVOURY LIQUID CONCENTRATE

(71) Applicant: Conopco Inc., Englewood Cliffs, NJ (US)

(72) Inventors: Winfried Sailer, Heilbronn (DE); Monika Renate Schänzel, Heilbronn (DE)

(73) Assignee: Conopco Inc., Englewood Cliffs, NJ (US)

( * ) Notice: Subject to any disclaimer, the term of this patent is extended or adjusted under 35 U.S.C. 154(b) by 711 days.

(21) Appl. No.: 17/253,766

(22) PCT Filed: Jul. 2, 2019

(86) PCT No.: PCT/EP2019/067767
§ 371 (c)(1),
(2) Date: Dec. 18, 2020

(87) PCT Pub. No.: WO2020/016004
PCT Pub. Date: Jan. 23, 2020

(65) Prior Publication Data
US 2021/0259293 A1  Aug. 26, 2021

(30) Foreign Application Priority Data
Jul. 19, 2018  (EP) ..................................... 18184381

(51) Int. Cl.
| A23L 23/10 | (2016.01) |
| A23L 27/20 | (2016.01) |
| A23L 27/22 | (2016.01) |
| A23L 27/40 | (2016.01) |
| A23L 29/212 | (2016.01) |
| A23L 29/269 | (2016.01) |

(52) U.S. Cl.
CPC ........... *A23L 23/10* (2016.08); *A23L 27/2028* (2016.08); *A23L 27/22* (2016.08); *A23L 27/40* (2016.08); *A23L 29/212* (2016.08); *A23L 29/27* (2016.08); *A23V 2002/00* (2013.01)

(58) Field of Classification Search
CPC ...... A23L 23/10; A23L 27/2028; A23L 27/22; A23L 27/40; A23L 29/212; A23L 29/27; A23L 23/00; A23L 27/00; A23V 2002/00; A23V 2250/032; A23V 2250/042; A23V 2250/0618; A23V 2250/5118; A23V 2250/606; A23V 2250/61; A23V 2250/628; A23V 2200/15; A23V 2200/16
USPC .......................... 426/589, 549, 578, 615, 661
See application file for complete search history.

(56) References Cited

U.S. PATENT DOCUMENTS

| 2,657,999 | A | * | 11/1953 | Rauch | A23L 11/05 |
| | | | | | 426/460 |
| 5,422,136 | A | * | 6/1995 | Fuisz | A23L 13/428 |
| | | | | | 426/661 |
| 5,904,949 | A | * | 5/1999 | Reddy | A23D 7/015 |
| | | | | | 426/578 |
| 2005/0244563 | A1 | * | 11/2005 | Cavalieri | A23L 29/35 |
| | | | | | 426/589 |
| 2008/0311251 | A1 | * | 12/2008 | Achterkamp | A23L 29/238 |
| | | | | | 426/573 |
| 2010/0129516 | A1 | * | 5/2010 | Siegel | A23L 23/10 |
| | | | | | 426/536 |
| 2012/0276271 | A1 | * | 11/2012 | Inoue | A23L 29/20 |
| | | | | | 426/573 |
| 2012/0308703 | A1 | * | 12/2012 | Ley | A23L 7/109 |
| | | | | | 426/536 |
| 2013/0309385 | A1 | * | 11/2013 | Perrine | A23L 29/256 |
| | | | | | 426/573 |
| 2014/0037822 | A1 | * | 2/2014 | Batenburg | A23L 27/45 |
| | | | | | 426/589 |
| 2014/0141146 | A1 | * | 5/2014 | Wang | A23L 23/00 |
| | | | | | 426/589 |
| 2015/0025158 | A1 | * | 1/2015 | Skorge | A23L 33/21 |
| | | | | | 514/778 |
| 2015/0099051 | A1 | * | 4/2015 | Grigonis | B65D 85/812 |
| | | | | | 426/589 |
| 2015/0181921 | A1 | * | 7/2015 | Perrine | A23L 23/00 |
| | | | | | 426/577 |
| 2015/0189902 | A1 | * | 7/2015 | Silva Paes | A23L 23/10 |
| | | | | | 426/50 |
| 2016/0088862 | A1 | * | 3/2016 | Woo | A23L 27/84 |
| | | | | | 426/74 |
| 2016/0135489 | A1 | * | 5/2016 | Batenburg | A23L 27/21 |
| | | | | | 426/637 |
| 2016/0235096 | A1 | * | 8/2016 | Arnaudov | A23L 23/00 |
| 2017/0000174 | A1 | * | 1/2017 | Fezer | A23L 27/00 |
| 2017/0367380 | A1 | * | 12/2017 | Ueckert | A23L 29/015 |
| 2018/0027846 | A1 | | 2/2018 | Arnaudov et al. | |
| 2018/0153200 | A1 | * | 6/2018 | Chapara | A23L 29/30 |
| 2018/0192678 | A1 | * | 7/2018 | Schumm | A23L 23/00 |
| 2019/0124965 | A1 | * | 5/2019 | Koppert | A23L 29/231 |
| 2022/0167647 | A1 | * | 6/2022 | Rosinski | A23P 10/43 |

FOREIGN PATENT DOCUMENTS

| CN | 108024560 A | 5/2018 |
| EP | 3123875 A1 | 2/2017 |

(Continued)

OTHER PUBLICATIONS

Legumes and Pulses _ The Nutrition Source _ Harvard T.H. Chan School of Public Health , p. 1 second paragraph, (Year: 2017).*

(Continued)

*Primary Examiner* — Drew E Becker
*Assistant Examiner* — Luis Eugenio Diou Berdecia
(74) *Attorney, Agent, or Firm* — N.V. Nederlandsch Octrooibureau

(57) ABSTRACT

The present invention relates to a savoury, liquid concentrate comprising gelatinized legume starch, more particularly a savoury concentrate that can be used as a base for the preparation of broth, bouillons, soups, sauces, gravies, etc. The present invention also relates to a method of preparing such a concentrate.

15 Claims, No Drawings

(56) References Cited

FOREIGN PATENT DOCUMENTS

| WO | WO-9510196 A1 * | 4/1995 | ............ A23C 19/054 |
| WO | WO-2007068402 A1 * | 6/2007 | ............ A23L 13/30 |
| WO | WO-2007068484 A1 * | 6/2007 | ............ A23L 1/40 |
| WO | WO-2011021372 A1 * | 2/2011 | ............ A21D 2/186 |
| WO | WO-2012097930 A1 * | 7/2012 | ............ A23L 1/05 |
| WO | 2013034520 A1 | 3/2013 | |
| WO | 2013064449 A1 | 5/2013 | |
| WO | WO-2014053287 A1 * | 4/2014 | ............ A23L 23/10 |
| WO | WO2014053288 | 4/2014 | |
| WO | WO-2014075913 A1 * | 5/2014 | ............ A23L 23/00 |
| WO | WO-2016050456 A1 * | 4/2016 | ............ A23L 23/00 |
| WO | WO-2016096663 A1 * | 6/2016 | ............ A23L 11/05 |
| WO | WO2016096666 | 6/2016 | |
| WO | WO-2016096666 A1 * | 6/2016 | ............ A23L 23/00 |
| WO | 2017021073 A1 | 2/2017 | |
| WO | WO-2017021070 A1 * | 2/2017 | ............ A23L 23/10 |
| WO | WO-2017046301 A1 * | 3/2017 | ............ A23L 23/00 |
| WO | WO-2018083296 A1 * | 5/2018 | ............ A23L 23/10 |
| WO | WO-2018178059 A1 * | 10/2018 | ............ A23D 7/005 |

OTHER PUBLICATIONS

Structural and functional properties of starches from field peas, Wang et al., Abstract, Dec. 2010 (Year: 2010).*

W. Banks; C.T. Greenwood; D.D. Muir; The characterization of starch and its components. Part 3: The technique of semi-micro, differential, potentiometric, iodine titration and the factors affecting it; Starch & Starke; Jan. 1, 1971; 118-124 (XP55544671); vol. 23 No. 4.

P. Colonna, et al.; Pisum sativum and vicia faba carbohydrates: Structrual Studies of Starches; Journal of Food Science; Aug. 1, 2006; pp. 88-93; vol. 46, No. 1.

Huang, Production Technology and Application of Resistant Starch; Henan Science & Technology Press, 2017, p. 32.

* cited by examiner

SAVOURY LIQUID CONCENTRATE

FIELD OF THE INVENTION

The present invention relates to a savoury liquid concentrate, more particularly a savoury concentrate that can be used as a base for the preparation of broth, bouillons, soups, sauces, gravies, etc. The invention also relates to a method of preparing such a savoury concentrate.

BACKGROUND OF THE INVENTION

Savoury concentrates have been used for a long time, traditionally in the form of dehydrated bouillon or stock cubes to be dissolved in water prior to consumption. Consumers are becoming increasingly aware of excessively artificially looking food products, and alternatives to the dried products, such as concentrates in the gel form, have been sought.

A high tendency to seek for 'clean label' food products, which focus on fewer ingredients and more natural ingredients, is also observed in the current consumer's behaviour. Products labelled as containing no additives, no preservatives, no chemically modified components, no components perceived by consumers as non-natural e.g. xanthan gum, and no artificial flavours or colours are highly preferred. However, chemically modified and artificial components are still used by food formulation scientists to provide satisfactory physical properties over the self-life of food products.

WO 2014/053288 describes savoury concentrates in the form of a gel. The gel concentrate comprises 20-50 wt. % water, 10-40 wt. % flavourings, 3-15 wt. % salt, 0.1-1.5 wt. % carrageenan and 10-40 wt. % ungelatinized starch, by weight of the total composition.

WO 2016/096666 also describes a savoury concentrate in gel form, the concentrate comprising 3-15% by weight of the total moisture of legume starch as a gelling agent and 10-40% by weight of the composition of ungelatinized starch. The legume starch used as gelling agent is selected from pea starch, chickpea starch, lentil starch, bean starch or combinations thereof. Ex. 2-4 describe savoury concentrate compositions in the form of a gel comprising pea starch.

WO 2016/096663 describes savoury concentrates in the form of gel. Examples 2, 3, 5 and 7 disclose shape retaining concentrates comprising from 4.5 to 7.1% gelatinized pea starch based on total moisture.

WO 2017/046301 describes flowable savoury concentrates comprising gelatinized and ungelatinized starches for the preparation of savoury food products such as bouillons, condiments, seasonings, sauces, gravies, stews, pan-fried dishes or soups. Example 8 describes a savoury composition comprising 52.77 wt. % water, 15.92 wt. % salt, 3.69 wt. % gelatinized starch (physically modified corn starch), 5 wt. % ungelatinized (pea starch), 7.38 wt. % fat/oil, 0.79 wt. % sugar and 14.45 wt. % flavourings.

There remains a need to provide a savoury concentrate that meets clean label requirements and consumer expectations. In addition, there is a need to provide savoury concentrates that are visually appealing.

SUMMARY OF THE INVENTION

It has been surprisingly found that gelatinized, legume starch advantageously provides a liquid, savoury concentrate that is clear (non-turbid) at ambient temperature and remains liquid after shear is applied (i.e., shear stable).

For the consumer, the concentrates according to the invention are visually appealing for being clear and presenting low turbidity, which resembles a homemade quality bouillon. The liquid savoury concentrate can be easily dosed and stored and is a suitable base for the preparation of soups, sauces, gravies, bouillons, and meals. In addition, the legume starch provides an unexpected shear stability that means processability of the concentrate according to the invention is facilitated.

Accordingly, there is provided a savoury, liquid concentrate comprising:
i) at least 45 wt. %, by weight of total composition, of water;
ii) 10-40 wt. %, by weight of total composition, of an edible salt selected from sodium chloride, potassium chloride and combinations thereof;
iii) 1-40 wt. %, by weight of total composition, of savoury taste giving ingredients selected from glutamate, 5'-ribonucleotides, sucrose, glucose, fructose, lactic acid, citric acid and combinations thereof;
iv) 2-5 wt. %, by weight of water, gelatinized legume starch preferably having an amylose content of at least 25 wt. % on dry basis of legume starch, wherein the concentrate comprises less than 0.2 wt. % xanthan gum, based on total weight of composition, and wherein ratio of gelatinized starch:total starch content is at least 0.5.

The present invention further pertains to a method for the preparation of a liquid concentrate, said method comprising combining:
a) combining ungelatinized legume starch preferably having an amylose content of at least 25 wt. % on dry basis of legume starch with water; an edible salt selected from sodium chloride, potassium chloride and combinations thereof; and savoury taste giving ingredients selected from glutamate, 5'-ribonucleotides, sucrose, glucose, fructose, lactic acid, citric acid and combinations thereof,
b) heating the mixture of step a) at a temperature of at least 70° C.

The invention further provides a process of preparing a meal, said process comprising the steps of mixing 10 parts by weight of the savoury concentrate according to the present invention, or obtained by the method according to the present invention, with 10-500 parts by weight of other meal components.

DETAILED DESCRIPTION OF THE INVENTION

In a first aspect, the present invention relates to a savoury, liquid concentrate comprising:
i) at least 45 wt. %, by weight of total composition, of water;
ii) 10-40 wt. %, by weight of total composition, of an edible salt selected from sodium chloride, potassium chloride and combinations thereof;
iii) 1-40 wt. %, by weight of total composition, of savoury taste giving ingredients selected from glutamate, 5'-ribonucleotides, sucrose, glucose, fructose, lactic acid, citric acid and combinations thereof;
iv) 2-5 wt. %, by weight of water, gelatinized legume starch preferably having an amylose content of at least 25 wt. % on dry basis of legume starch, wherein the concentrate comprises less than 0.2 wt. % xanthan gum, based on total weight of composition, and wherein ratio of gelatinized starch:total starch content is at least 0.5.

Whenever reference is made herein to water content, unless indicated otherwise, said water content includes unbound (free) as well as bound water.

The word 'comprising' as used herein is intended to mean 'including' but not necessarily 'consisting of' or 'composed of'. In other words, the listed steps or options need not be exhaustive.

Unless specified otherwise, numerical ranges expressed in the format 'from x to y' or 'x-y' are understood to include x and y. When for a specific feature multiple preferred ranges are described in the format 'from x to y' or 'x-y', it is understood that all ranges combining the different endpoints are also contemplated. For the purpose of the invention ambient temperature is defined as a temperature of about 20° C.

Unless indicated otherwise, weight percentages (wt. %) are based on the total weight of the concentrate.

The term "starch" as used herein, unless indicated otherwise, refers to native, non-chemically modified starch. Starch consists of two types of molecules: the linear and helical amylose and the branched amylopectin.

The term "gelatinized starch" as used herein refers to starch that has undergone a heat treatment resulting in the crystalline starch structure becoming an amorphous structure. During starch gelatinization, the intermolecular bonds of starch molecules are broken down in the presence of water and heat, allowing the hydrogen bonding sites to engage more water. This irreversibly dissolves the starch granule. Penetration of water increases randomness in the general starch granule structure and decreases the number and size of crystalline regions. Under the microscope in polarized light starch loses its birefringence and its extinction cross during gelatinization. The extent to which the starch present has an amorphous structure can suitably be determined by cross polarised light microscopy. The gelatinization temperature depends on the degree of cross-linking of the amylopectin. Likewise, as used herein, "native starch" refers to starch which has not undergone any chemical modifications (i.e., chemically modified starch). Native starch is commonly referred to as simply starch on the product label.

The amorphous structure of gelatinized starch can be suitably distinguished and visualized by means of XRT (X-ray micro computed tomography, also known as micro-CT) or SEM (scanning electron microscopy). The shattered, amorphous irregular structure lacking in birefringence of the gelatinized starch particles can suitably be recognised, compared to native (crystalline) starch. The amount of gelatinized starch can be enzymatically determined by the AACC 76-31.01 method.

The term "total starch content" as used herein means the sum of native starch+damaged/gelatinized+resistant starch. Total starch content can be measured according ISO 15914: 2004.

The term "liquid" as used herein has the usual meaning in the art e.g. the liquid is non-shape retaining once removed from the packaging. That is, the liquid formulation is not a solid or semi-solid as understood by the average skilled person. The term "liquid" as used herein means a concentrate having a viscosity of less than 2 Pa·s measured at a shear rate of 30/s at 25° C.

The term "by weight of water" as used herein means the total water (moisture) content of the savoury concentrate.

Savoury Concentrate

The savoury, liquid concentrate according to the present invention is an edible product. In other words, a "savoury, liquid concentrate" in the context of the present application means an edible product used in the preparation of soups, sauces, gravies, bouillons and meals. Consequently, also the ingredients of the savoury concentrate are all edible ingredients.

The savoury, liquid food concentrate according to the invention is designed to provide an edible product, that is a ready-to-eat product, after an appropriate dilution and heating as appropriate with an aqueous phase and optionally other ingredients. The term dilution in this respect is intended to include dissolving and dispersing as these take place concurrently. The ready-to-eat product (edible product) is preferably a soup, sauce, gravy, bouillon and/or meal. The sauce may be part of dish like a stew or a risotto. The dilution of the concentrate according to the invention is usually between 10 g/L and 500 g/L, more preferably between 15 g/L and 350 g/L, even more preferably 20 g/L and 250 g/L. The term "savoury, liquid concentrate" and "concentrate" are used interchangeably.

Preferably, the liquid savoury concentrate of the invention has a viscosity of less than 2 Pa·s, preferably less than 1 Pa·s. More preferably in the range of 200-600 mPa·s, as measured at a shear rate of 30/s at 25° C. Preferably, the savoury, liquid concentrate has a viscosity of less than 15 Pa·s, preferably less than 14 Pa·s, more preferably less than 12 Pa·s, as measured at a shear rate of 1/s at 25° C.

According to a particularly preferred embodiment, the savoury concentrate of the present invention is in the form of a clear solution. "Clear solution" refers to the transparency of the sample assessed by eye, i.e. optically. A liquid which appears transparent does so because it scatters little or no visible light. In the context of the present invention, "clearness" can be determined using, e.g., the whiteness index measured with a spectral photometer e.g. spectral photometer CM5, Konica Minolta. Clearness can also be assessed using ASTM E313-15e1, Standard Practice for Calculating Yellowness and Whiteness Indices from Instrumentally Measured Color Coordinates, ASTM International, West Conshohocken, P A, 2015, using colorimeter. Clearness of the savoury concentrate according to the invention is suitably determined after filtering the liquid concentrate to remove particulates dispersed in the savoury concentrate (e.g. herbs, spices, etc.) having diameter of less than 3000 micrometre. The higher the value in whiteness index (WI), the clearer the solution; the lower the value, the whiter the solution. Accordingly, in a preferred embodiment, the savoury, liquid concentrate of the invention is a clear solution, i.e., preferably having a WI(E313-96/(D65)) of more than 40, more preferably more than 50, even more preferably more than 60.

The savoury concentrate according to the invention is shear stable. As used herein, shear stability means that the product does not become more liquid upon shear as measured with a Bostwick consistometer, 10 s distance value at 25° C.

The savoury, liquid concentrate preferably comprises at least 50 wt. % water, more preferably at least 55 wt. % water, even more preferably at least 65 wt. % water, by weight of the concentrate.

Preferably, the savoury concentrate comprises 2.5-4.5 wt. % gelatinized starch, more preferably 3-4 wt. % gelatinized starch, by weight of water, of the concentrate according to the invention.

Preferably, the gelatinized legume starch has an amylose content of in the range of 25 to 65 wt. % on dry basis of legume starch, more preferably in the range 30 to 60 wt. %, even more preferably in the range 35 to 55 wt. % on dry basis of legume starch.

Advantageously, the amylose content is preferably greater than 28 wt. %, preferably greater than 30 wt. %, even more preferably greater than 35 wt. % on dry basis of legume starch.

Amylose content can be determined according to the method disclosed by W. Banks, C. T. Greenwood, D. D. Muir. The characterization of starch and its components. Part 3: The technique of semi-micro, differential, potentiometric, iodine titration and the factors affecting it. Starch/Stärke 23 (4), 1971, 118-124.

In one embodiment, at least 75 wt. %, based on the total starch content, is provided by gelatinized legume starch, preferably at least 90 wt. %, even more preferably at least 95 wt. %, based on the total starch content, is provided by gelatinized legume starch. In other words, at least 75 wt. %, preferably at least 90 wt. %, more preferably at least 95 wt. % of the total starch present is provided by the gelatinized legume starch.

In a further preferred embodiment, the gelatinized starch is native legume starch. Preferably the concentrate is substantially free of chemically modified starch. In other words, the savoury concentrate comprises less than 1 wt. % chemically modified starch.

Suitable (native) legume starch can be derived from Fabaceae fruit seeds. Suitable sources of legume starch are selected from the group of legumes consisting of (*Glycine max*), beans (*Phaseolus*), pea (*Pisum sativum*), chickpeas (*Cicer arietinum*), peanut (*Arachis hypogaea*), carob (*Ceratonia 8ilique*), pigeon pea (*Cajanus cajan*), lentil (*Lens culinaris*), cowpea (*Vigna unguiculate*), or combinations thereof. Preferably, the legume is selected from pea (*Pisum sativum*), pigeon pea (*Cajanus cajan*), chickpeas (*Cicer arietinum*), lentil (*Lens culinaris*) and cowpea (*Vigna unguiculate*), or combinations thereof.

In a yet another preferred embodiment, the gelatinized starch is native legume starch, wherein the legume belongs to the genus *Pisum sativum*.

In one preferred embodiment, at least 50 wt. %, based on total gelatinized starch, is provided by pea (*Pisum sativum*) starch, more preferably, at least 75 wt. % from pea (*Pisum sativum*) starch, even more preferably, at least 90 wt. % from pea (*Pisum sativum*) starch, most preferably 100 wt. % pea (*Pisum sativum*) starch, based on total gelatinized starch.

Typically, the gelatinized legume starch is provided by a legume starch component that comprises at least 50 wt. %, based dry matter of starch component, starch, more preferably at least 60 wt. % starch, even more preferably at least 70 wt. % starch, yet more preferably at least 80 wt. %, most preferably at least 90 wt. % starch, all based dry matter of starch component.

Preferably, the savoury concentrate is essentially free of legume flour. Preferably, the savoury concentrate comprises less than 5 wt. %, more preferably less than 2 wt. %, even more preferably less than 1 wt. %, most preferably less than 0.1 wt. % legume flour.

The savoury concentrate is essentially free from xanthan gum, that is the savoury concentrate comprises less than 0.2 wt. %, by weight of the total composition, xanthan gum. Preferably, the savoury concentrate comprises less than 0.1 wt. %, by weight of the total composition, xanthan gum.

The relative amount of gelatinized starch based on the total starch content is at least 0.5, preferably at least 0.6, more preferably at least 0.7 and most preferably at least 0.8. Total starch content (native+damaged/gelatinized+resistant) can be measured according ISO 15914:2004 and the gelatinized starch content can be measured according to AACC 76-31.01 (Determination of Damaged Starch—Spectrophotometric Method).

In one embodiment according to the invention, the concentrate comprises at most 2.5 wt. %, by weight of water, ungelatinized starch, more preferably at most 2.0 wt. %, even more preferably at most 1.0 wt. % by weight of water. If used, ungelatinized starch is selected from corn starch, potato starch, waxy potato starch, tapioca, rice starch or waxy rice starch. According to one embodiment, the savoury concentrate is substantially free of ungelatinized starch. By "substantially free" is meant the composition comprises less than 5 wt. %, by weight of water, ungelatinized starch, more preferably less than 3 wt. %, even more preferably less 1.5 wt. % by weight of water, yet more preferably less than 1.0 wt. %, most preferably less than 0.5 wt. %, by weight of water, of ungelatinized starch.

According to an embodiment, the amount of edible salt, 15-35 wt. %, preferably 20-30 wt. %, by weight of water.

The savoury, liquid concentrate of the invention may comprise fat and/or oil. Accordingly, in a preferred embodiment, the amount of fat and/or oil is 1-10 wt. %, by weight of the total composition, more preferably 2-8 wt. %, even more preferably 3-6 wt. % by weight of the total composition.

The terms 'fat' or 'oil' are used interchangeably, unless specified otherwise. The terms 'fat' and 'oil' as used herein refers to glycerides selected from triglycerides, diglycerides, monoglycerides, phosphoglycerides, free fatty acids and combinations thereof.

Preferably, the solid fat content of the fat and/or oil used in the concentrate of the invention is less than 40% at 20° C. ($N_{20}$), preferably less than 20%. Solid fat content can suitably be determined using the method described in *Animal and vegetable fats and oils—Determination of solid fat content by pulsed NMR—Part 1: Direct method*—ISO 8292-1:2008.

Preferably, the savoury, liquid concentrate comprises at least 50 wt. %, by total weight of fat and/or oil, of liquid oil, more preferably at least 75-95 wt. %, even more preferably 85-90 wt. %. The term "liquid oil" as used herein refers to fat that is liquid at 20° C. Suitable liquid oils include, but are not limited to sunflower oil, soybean oil, rapeseed oil, maize oil, olive oil, cottonseed oil, safflower oil, palm olein and combinations thereof.

Preferably, the savoury, liquid concentrate comprises:
i) at least 50 water wt. %, by weight of total composition;
ii) 20-40 wt. %, by weight of total composition, of an edible salt selected from sodium chloride, potassium chloride and combinations thereof;
iii) 1-20 wt. %, by weight of total composition, of savoury taste giving ingredients selected from glutamate, 5'-ribonucleotides, sucrose, glucose, fructose, lactic acid, citric acid and combinations thereof;
iv) 2-4 wt. %, by weight of water, gelatinized native pea starch preferably having an amylose content of at least 25 wt. % on dry basis of starch,
wherein the concentrate comprises less than 0.2 wt. % xanthan gum, based on total weight of composition, and wherein ratio of gelatinized starch:total starch content is at least 0.5.

The savoury, liquid concentrate according to the invention may comprise non-dissolved ingredients are visible and dispersed throughout the concentrate. Accordingly, in an embodiment, the savoury concentrate comprises 1-35 wt. % of particulate plant material selected from herbs, spices, vegetables and combinations thereof. The savoury concentrate preferably contains 5-30 wt. %, more preferably 10-25 wt. % of particulate plant material selected from herbs, spices, vegetables and combinations thereof.

Inclusion of a high level of fine particulate plant material can have an adverse effect on the properties of the savoury concentrate, such as turbidity. Accordingly, the savoury concentrate preferably contains not more than 20 wt. %, preferably not more than 15 wt. %, more preferably not more than 10 wt. %, even more preferably not more than 5 wt. % of particulate plant material having a diameter of less than 1,000 micrometre, more preferably less than 500 micrometre, even more preferably less than 100 micrometre.

Preferably, the components of the composition i) to iv) represents at least 70 wt. %, more preferably at least 80 wt. %, even more preferably at least 90 wt. % of the savoury concentrate.

Method

In a second aspect, the present invention relates to a method for the preparation of the liquid concentrate defined herein, said method comprising combining:
a) combining ungelatinized legume starch preferably having an amylose content of at least 25 wt. % on dry basis of starch with water; an edible salt selected from sodium chloride, potassium chloride and combinations thereof; and savoury taste giving ingredients selected from glutamate, 5'-ribonucleotides, sucrose, glucose, fructose, lactic acid, citric acid and combinations thereof,
b) heating the mixture of step a) at a temperature of at least 70° C.

Preferably, the ungelatinized starch is a native legume starch. Typically, the native legume starch exhibits a 'C' polymorph as determined by X-ray diffraction. The 'C'-type polymorph is intermediate between the 'A'-type polymorph and 'B'-type polymorph. Preferably, the native legume starch exhibits a 'C' polymorph and comprises 10-50% B polymorph. X-ray diffraction of legume starches is known to the skilled person and can be carried out using known methods, as for example described P. Colonna, A. Buleon, C. Mercier, *Pisum sativum* and *Vicia faba* Carbohydrates: Structural Studies of Starches, *Journal of Food Science*, 46 (1):88-93 August 2006.

Preferably, the legume starch has a degree of crystallinity of at least 10%. Preferably, the degree of crystallinity is at least 15%, preferably at least 20%. Typically, the native legume starch has a degree of crystallinity in the range of 10 to 50%, more preferably 15 to 45%.

In another preferred embodiment, the ungelatinized starch comprises at most 2 wt. %, preferably at most 1 wt. %, on dry basis of starch, of proteins.

In a particularly preferred embodiment, the ungelatinized starch comprises at most 2 wt. %, preferably at most 1 wt. %, on dry basis of starch, of legume proteins.

Preferably, the mixture is heated at a temperature of 70 to 85° C. for at least 5 minutes, more preferably at least 8 minutes, even more preferably 10 to 25 minutes.

Alternatively, the mixture is heated at a temperature of at least 90° C., more preferably at least 95° C., for less than 5 minutes, more preferably less than 3 minutes, even more preferably less than 2 minutes.

Preferably, the legume starch has a volume weighted mean diameter in the range of 2 to 40 micrometre, more preferably in the range 5 to 30 micrometre.

Typically, the starch is added as a powder wherein at most 20%, preferably at most 15%, more preferably at most 10%, of particles are retained by a sieve having apertures of 200 micrometre.

The description of the components of the savoury concentrate apply mutatis mutandis to the components used in the method for preparing a savoury concentrate as defined herein.

In a third aspect, the present invention relates to a savoury liquid concentrate, wherein the concentrate is a condiment, seasoning, sauce, soup, bouillon, stock or gravy.

Yet another aspect of the invention relates to a process of preparing a meal, said process comprising the steps of mixing 1 parts by weight of the savoury concentrate according to any one of claims 1-13 with 1-50 parts by weight of other meal components.

Preferably, 1 part by weight of the savoury concentrate is mixed with 1-40 parts by weight of aqueous liquid. Examples of ready-to-eat products that can be prepared in this manner include soups, sauces, gravies, bouillons and meals.

According to one embodiment, the savoury concentrate is mixed with hot aqueous liquid having a temperature of at least 50° C., preferably of at least 70° C.

In accordance with another embodiment, the savoury concentrate is mixed with cold water having a temperature of less than 30° C. and the resulting mixture is subsequently heated to a temperature in excess of 70° C.

Preferably, the present process comprises mixing 1 part by weight of the savoury concentrate with 4-20 parts by weight of aqueous liquid.

The aqueous liquid that is mixed with the savoury concentrate typically contains at least 70 wt. %, more preferably at least 80 wt. % of water.

The invention is further illustrated by the following non-limiting examples.

EXAMPLES

Example 1

Samples 1-5 were prepared by adding a starch component, and NaCl if used, to water and mixing at shear level 3 at 30° C. using Thermomix TM31, followed by heating up the mix at shear level 3 to 85° C. and holding temperature for 3 min and finally heating up at shear level 3 to 98° C. and holding temperature for 1 min. The samples were cooled to room temperature before evaluating the visual appearance of the samples.

Test starch solutions were tested as to their clearness to the naked eye by trained panellists, at room temperature. The starch solutions comprise native gelatinized starch, water and salt, at the concentrations (in wt. %) defined in Table 1:

TABLE 1

| Sample | Starch component concentration (wt. %) | NaCl concentration (wt. %) | |
| --- | --- | --- | --- |
| | | 0% | 25% |
| 1 | Corn[1] 3% | Opaque | Opaque |
| 2 | Pea[2] 3% | Opaque | Clear |
| 3 | Corn 3.8% | Opaque | Opaque |
| 4 | Pea 3.8% | Opaque | Clear |
| 5 | Potato[3] 3.8% | relatively clear | Clear |

[1]Corn starch
[2]pea starch Roquette Freres
[3]native potato starch

Clearness of native pea starch and native potato starch in high salt solutions was measured using whiteness index measured with a spectral photometer e.g. spectral photometer CM5, Konica Minolta (Transmission, measuring orifice: 30 mm LAV). Equipment: Spectral photometer CM5, Konica Minolta:

Measurement: Transmission (Haze activated)
Measuring orifice: 30 mm (LAV=Large aperture view)

The samples were measured after calibration of the equipment. The samples were turned twice gently upside down prior to filling the cuvette. The measurement is done against white and black. The evaluation was done with the whiteness index against white. Concentrations and results are given in Table 2.

TABLE 2

| Sample | Starch component and concentration (wt. % based on water) | NaCl (wt. % based on water) | pH | Whiteness Index [WI] |
|---|---|---|---|---|
| 6 | Potato 4% | 20 | 5 | 80.32 |
| 7 | Pea 4% | 20 | 5 | 66.12 |

Both solutions are satisfactorily clear. Subsequently, clearness of native pea starch savoury solutions at different starch and salt concentrations has been measured. The results are presented in Table 3 (% weight based on water):

TABLE 3

| Test | Starch component and concentration (wt. %) | NaCl (wt. %) | pH* | Whiteness Index [WI] |
|---|---|---|---|---|
| 8 | pea 2.5% | 0 | 3.8 | 14 |
| 9 | pea 2.5% | 10 | 3.8 | 66 |
| 10 | pea 2.5% | 0 | 6.5 | 6 |
| 11 | pea 4% | 10 | 6.5 | 39 |
| 12 | pea 4% | 20 | 6.5 | 70 |
| 13 | pea 4% | 20 | 3.8 | 69 |
| 14 | pea 4% | 20 | 5 | 66 |

*citric acid anhydrous q.s. to 100.

The higher the WI value, the clearer the solution. Solutions comprising gelatinized native pea starch present good clearness in presence of salt.

Example 2

Shear effect and transparency of liquid savoury solutions comprising gelatinized native potato starch and gelatinized native pea starch were compared.

Transparency was measured as described in Example 1. The solutions have pH 5.

The sheared and non-sheared samples are prepared as follows:
1. Providing a vessel with water;
2. Mixing a premix of dry ingredients at shear level 3 at 30° C. using Thermomix TM31;
3. Heating up the mix at shear level 3 to 85° C. and holding temperature for 3 min;
4. Heating up at same shear level 3 to 98° C. and holding temperature for 1 min;
5. Applying shear for 2 min at shear level 5 (approximately 2000 rpm);
6. Transferring the mixture for cooling into the vessel of a HOTMIXPRO (Professional multifunctional food processor) equipment;
7 Start cooling after pasteurization step;
8. Cooling with temperature setting 30° C. at shear level 1F with stirrer tool attached; to ensure sufficient shear agitation, resulting in a cooling rate of about 1° C.-1.7° C./min;
9. Filing samples filling at 30° C. in appropriate containers.

The non-sheared sample (i.e. "before shear") is produced under same conditions but without step 5.

Shear effect was determined using Bostwick consistometer, 50 g filling weight, distance value after 10 s at 25° C. Bostwick values are given in millimetres.

The results are shown in table 4.

TABLE 4

| | | | | Bostwick value | | |
|---|---|---|---|---|---|---|
| Sample | Starch type and conc. (wt. % on water) | NaCl (wt. % on water) | Whiteness Index | Before shear | After Shear (measured after 1 day) | Shear stability |
| 14 | Pea 4% | 20 | 66 | 90 | 55 | Acceptable |
| 15 | Potato 4% | 20 | 80 | 75 | 130 | Unacceptable |

Both samples 14 and 15 are satisfactorily clear at 20 wt. % NaCl. The consistency of sample 14 is acceptable after shear has been applied in that sample 14 does not become more liquid after shear is applied, whereas sample 15 (potato starch) thins unacceptably.

Example 3

Transparency and shear effect on native gelatinized pea starch solutions comprising liquid oil have been tested. The tested composition is as in Table 5.

TABLE 5

| | wt. % |
|---|---|
| Water | 75.86 |
| Salt | 18.97 |
| Pea Starch* | 3.16 |
| Sunflower oil | 2.00 |
| Citric acid | 0.01 |

*Roquette Freres

The savoury concentrate was prepared using a Thermomix TM 31, for cooling: (Professional multifunctional food processor) with a batch size of 2000 g using the following steps:
1. Water added to the vessel and heating started
2. Premix of the dry ingredients added at shear level 3 at 30° C.
3. Heated up the mix at shear level 3 to 85° C.
4. Added the oil at shear level 3
5. Heated to 85° C. and held the temperature at 85° C. for 3 min
6. Heated up further at shear level 3 to 98° C. and held temperature for 1 min
7. Transfer the product for cooling into the vessel of Hotmix equipment
8. Cooling step with temperature setting 30° C. at shear level 1F with stirrer tool attached to knife to ensure sufficient shear agitation, resulting in a cooling rate of about 1° C.-1.7° C./min depending on the recipe
9. Samples filled at target temperature e.g. 30° C. in appropriate containers and closed/sealed.

Evaluation was performed 1 day after preparation: Colour measurement (whiteness) assessment was conducted as per example 1. Shear effect (Bostwick value) was performed as per example 2.

The results are shown in table 6.

TABLE 6

| Pea starch (wt. % based on water) | NaCl (wt. % based on water) | Whiteness Index | Bostwick value |
|---|---|---|---|
| 4 | 20 | 55 | 130* 110^ |

*before shear
^after 1 day

Example 4

A liquid savoury concentrate according to the invention was prepared having the composition according to table 7:

TABLE 7

|  | wt. % |
|---|---|
| Water | 66.53 |
| Salt | 16.63 |
| Pea Starch* | 2.77 |
| Sugar | 2.83 |
| Monosodium glutamate | 6.65 |
| 50:50 Mix of disodium inosinate and disodium guanylate | 0.67 |
| Yeast extract liquid | 2.08 |
| Chicken extract | 1.75 |
| Citric acid | 0.08 |

*Roquette Freres

The savoury concentrate was prepared using a Thermomix TM 31, for cooling: HOTMIXPRO (Professional multifunctional food processor) with a batch size of 2000 g using the following steps:
1. Water added to the vessel and heating started
2. Premix of the dry ingredients added at shear level 3 at 30° C.
3. Heated up the mix at shear level 3 to 85° C. and held temperature for 3 min
4. Heated up further at shear level 3 to 98° C. and held temperature for 1 min
5. Transferred the product for cooling into the vessel of Hotmix equipment
6. Cooling with temperature setting 30° C. at shear level 1F with stirrer tool attached to knife to ensure sufficient shear agitation, resulting in a cooling rate of about 1° C.-1.7° C./min depending on the recipe
7. Samples filling at target temperature e.g. 30° C. in appropriate containers and closed/sealed Evaluation was performed 1 day after preparation: Colour measurement (whiteness) assessment was conducted as per example 1. Sheer effect (Bostwick value) was performed as per example 2.

The results are shown in table 8.

TABLE 8

| Pea starch (wt. % based on water) | NaCl (wt. % based on water) | Bostwick value |
|---|---|---|
| 4 | 20 | 160* 130^ |

*before shear
^after 1 day

The savoury concentrate is slightly brownish in colour and clear in appearance.

Example 5

A savoury concentrate according to Example 8 of WO 2017/046301 has been reproduced as a comparative example. The composition of the concentrate is as given in Table 4:

TABLE 4

|  | wt. % | |
|---|---|---|
| Ingredient | A | B |
| Water | 52.77 | 52.77 |
| Salt | 15.92 | 15.92 |
| First starch[1] | 3.69 | 3.69 |
| Second starch[2] | 5 | 5 |
| Fat/oil | 7.38 | 7.38 |
| Sugar | 0.79 | 0.79 |
| Flavouring | 14.45 | 14.45 |
| First starch based on weight of water | 7 wt. % | 7 wt. % |
| Second starch based on weight of water | 9.5 wt. % | 9.5 wt.% |

[1]A: physically modified corn starch—Novation 2300; B—physically modified corn starch—Novation 300
[2]ungelatinized pea starch from supplier Roquette The concentrate has been prepared using the following method described in example 8 of WO 2017/046301:
- the first starch (physically modified corn starch-Novation 2300) was added to water with mixing at about 50° C.;
- the mix was heated to a temperature of at least 90° C. for at least 2 minutes;
- salt was added to the mix, which was pasteurized at a temperature of at least 72° C. for at least 5 minutes;
- after cooling the mix to ca. 40° C., the second starch (pea starch) was added with further mixing;
- composition was filled into containers (tube and beaker).

The resulting savoury concentrate A is a white opaque (not clear) mass that is shape retaining, when stored and removed out of a tube.

The savoury concentrate B was prepared as per concentrate A. The shear stability was evaluated by subjecting the concentrate to shear (2 min at shear level 5 in a Thermomix TM31 as per example 2 above). The results are presented in Table 5:

TABLE 5

|  | Bostwick value (mm) |
|---|---|
| B before shear | 73 |
| B after shear | 130 |

The invention claimed is:
1. A savoury, liquid concentrate comprising:
   i) at least 45 wt. % water, by weight of total composition;
   ii) 10-40 wt. %, by weight of total composition, of an edible salt selected from sodium chloride, potassium chloride and combinations thereof;
   iii) 0.1-40 wt. %, by weight of total composition, of savoury taste giving ingredients selected from glutamate, 5'-ribonucleotides, sucrose, glucose, fructose, lactic acid, citric acid and combinations thereof;
   iv) 2-5 wt. %, by weight of water, gelatinized legume starch,
   wherein the concentrate comprises less than 0.2 wt. % xanthan gum, based on total weight of composition, and wherein the ratio of gelatinized starch:total starch content is at least 0.5, and wherein the concentrate has a viscosity of less than 2 Pa·s measured at a shear rate of 30/s at 25° C.

2. The savoury, liquid concentrate according to claim 1, wherein the ratio of gelatinized starch:total starch content is at least 0.75.

3. The savoury, liquid concentrate according to claim 1, wherein the amount of gelatinized starch is 2.5-4.5 wt. %.

4. The savoury, liquid concentrate according to claim 1, wherein the gelatinized legume starch is a native legume starch.

5. The savoury, liquid concentrate according to claim 1, wherein the legume belongs to a genus selected from the group consisting of *Pisum sativum, Cajanus cajan, Cicer arietimum, L. culinaris* and *Vigna unguiculate*, or combinations thereof.

6. The savoury, liquid concentrate according to claim 1, wherein the amount of edible salt is 15-35 wt. %.

7. The savoury, liquid concentrate according to claim 1, wherein the composition comprises fat and/or oil.

8. The savoury, liquid concentrate according to claim 1, comprising:
   i) at least 55 wt. % water, by weight of total composition;
   ii) 20-40 wt. %, by weight of total composition, of an edible salt selected from sodium chloride, potassium chloride and combinations thereof;
   iii) 1-20 wt. %, by weight of total composition, of savoury taste giving ingredients selected from glutamate, 5'-ribonucleotides, sucrose, glucose, fructose, lactic acid, citric acid and combinations thereof;
   iv) 2-4 wt. %, by weight of water, gelatinized native pea starch, wherein the concentrate comprises less than 0.2 wt. % xanthan gum, based on total weight of composition, and wherein ratio of gelatinized starch:total starch content is at least 0.5.

9. The savoury, liquid concentrate according to claim 1, wherein the concentrate comprises at most 2.5 wt. %, by weight of water, ungelatinized starch.

10. The savoury, liquid concentrate according to claim 1, wherein non-dissolved ingredients are visible and dispersed throughout the concentrate.

11. A method for the preparation of a liquid concentrate according to claim 1, said method comprising combining:
   a) combining ungelatinized legume starch, with water; an edible salt selected from sodium chloride, potassium chloride and combinations thereof; and savoury taste giving ingredients selected from glutamate, 5'-ribonucleotides, sucrose, glucose, fructose, lactic acid, citric acid and combinations thereof, and
   b) heating the mixture of step a) at a temperature of at least 70° C.

12. The method according to claim 11, wherein the legume starch is a native legume starch.

13. The method according to claim 11, wherein the starch has a protein content of at most 2 wt. % on dry basis of starch.

14. The method according to claim 11, wherein the legume starch has a volume weighted mean diameter in the range of 2 to 40 micrometre.

15. The savoury, liquid concentrate according to claim 1, wherein the concentrate is a condiment, seasoning, sauce, soup, bouillon, stock or gravy.

* * * * *